United States Patent
Sadovitch

(10) Patent No.: US 11,250,816 B2
(45) Date of Patent: Feb. 15, 2022

(54) METHOD, DEVICE AND COMPUTER-READABLE STORAGE MEDIUM WITH INSTRUCTIONS FOR CONTROLLING A DISPLAY OF AN AUGMENTED-REALITY HEAD-UP DISPLAY DEVICE FOR A TRANSPORTATION VEHICLE

(71) Applicant: VOLKSWAGEN AKTIENGESELLSCHAFT, Wolfsburg (DE)

(72) Inventor: Vitalij Sadovitch, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/644,387

(22) PCT Filed: Aug. 23, 2018

(86) PCT No.: PCT/EP2018/072830
§ 371 (c)(1),
(2) Date: Mar. 4, 2020

(87) PCT Pub. No.: WO2019/057439
PCT Pub. Date: Mar. 28, 2019

(65) Prior Publication Data
US 2021/0110791 A1    Apr. 15, 2021

(30) Foreign Application Priority Data
Sep. 21, 2017   (DE) .................. 10 2017 216 774.2

(51) Int. Cl.
G09G 5/00    (2006.01)
G09G 5/37    (2006.01)
(Continued)

(52) U.S. Cl.
CPC ............. *G09G 5/37* (2013.01); *B60K 35/00* (2013.01); *G02B 27/0101* (2013.01);
(Continued)

(58) Field of Classification Search
CPC ................... G06T 19/006; G02B 2027/0138
See application file for complete search history.

(56) References Cited

U.S. PATENT DOCUMENTS 8,009,024 B2   8/2011   Enya et al.
8,144,076 B2   3/2012   Kakizaki
(Continued)

FOREIGN PATENT DOCUMENTS

CA    2999961 A1    4/2017
CN    1967147 A     5/2007
(Continued)

OTHER PUBLICATIONS

Binstock; Optimizing VR Graphics with Late Latching; Oculus Developer Blog; Mar. 1, 2015; downloaded from https://developer.oculus.com/blog/optimizing-vr-graphics-with-late-latching/?locale=en_US.
(Continued)

*Primary Examiner* — Nan-Ying Yang
(74) *Attorney, Agent, or Firm* — Barnes & Thornburg LLP

(57) ABSTRACT

A method, a device and a computer-readable storage medium with instructions for controlling a display of an augmented-reality head-up display device for a transportation vehicle. Interfering movements of the transportation vehicle are detected, a graphics generator generates a dynamically-embodied marker for display by the augmented-reality head-up display device, and the generated marker is outputted for display by the augmented-reality head-up display device.

19 Claims, 6 Drawing Sheets

(51) Int. Cl.
  B60K 35/00 (2006.01)
  G02B 27/01 (2006.01)
  G06K 9/00 (2022.01)
  H04N 13/204 (2018.01)
(52) U.S. Cl.
  CPC .. G06K 9/00791 (2013.01); *B60K 2370/1529* (2019.05); *B60K 2370/166* (2019.05); *B60K 2370/167* (2019.05); *B60K 2370/177* (2019.05); *B60K 2370/21* (2019.05); *G02B 2027/014* (2013.01); *G02B 2027/0141* (2013.01); *G09G 2354/00* (2013.01); *G09G 2380/10* (2013.01); *H04N 13/204* (2018.05)

(56) References Cited

U.S. PATENT DOCUMENTS

| | | | |
|---|---|---|---|
| 10,989,929 | B2 | 4/2021 | Nagano et al. |
| 2002/0121969 | A1 | 9/2002 | Joao |
| 2004/0130442 | A1 | 7/2004 | Breed et al. |
| 2010/0066832 | A1 | 3/2010 | Nagahara et al. |
| 2011/0022255 | A1 | 1/2011 | Yamada et al. |
| 2011/0128139 | A1* | 6/2011 | Tauchi ............... B60Q 9/008 340/439 |
| 2015/0298654 | A1 | 10/2015 | Joao et al. |
| 2016/0147073 | A1* | 5/2016 | Onda .................. G02B 27/01 345/7 |
| 2016/0167672 | A1 | 6/2016 | Krueger |
| 2016/0364621 | A1* | 12/2016 | Hill ........................ G06T 7/70 |
| 2017/0151994 | A1* | 6/2017 | Braunberger ......... B60Q 9/008 |
| 2018/0024354 | A1* | 1/2018 | Shibata ............. B60W 30/165 345/7 |

FOREIGN PATENT DOCUMENTS

| | | |
|---|---|---|
| DE | 102008046038 A1 | 3/2009 |
| DE | 102009004432 A1 | 7/2009 |
| DE | 102014214516 A1 | 1/2016 |
| DE | 102014221608 A1 | 4/2016 |
| DE | 102014118191 A1 | 6/2016 |
| DE | 102016009667 A1 | 4/2017 |
| EP | 1785326 A1 | 5/2007 |
| EP | 3100913 A2 | 12/2016 |
| EP | 3127771 A2 | 2/2017 |
| JP | 2016147652 A | 8/2016 |
| WO | 2017134866 A1 | 8/2017 |

OTHER PUBLICATIONS

Detle; Valve's "Lighthouse" Tracking System May Be Big News for Robotics; May 17, 2015; downloaded from http://www.hizook.com/blog/2015/05/17/valves-lighthouse-tracking-system-may-be-big-news-robotics.

Lavalle; The Latent Power of Prediction; Oculus Developer Blog; Jul. 12, 2013; downloaded from https://developer.oculus.com/blog/the-latent-power-of-prediction/?locale=en_US.

Pelot; Dynamic Blanking for Virtual Reality Image Displacement; Virtual Reality, Course Report; Stanford EE 267; Spring 2016.

Search Report for International Patent Application No. PCT/EP2018/072830; dated Nov. 14, 2018.

\* cited by examiner

METHOD, DEVICE AND COMPUTER-READABLE STORAGE MEDIUM WITH INSTRUCTIONS FOR CONTROLLING A DISPLAY OF AN AUGMENTED-REALITY HEAD-UP DISPLAY DEVICE FOR A TRANSPORTATION VEHICLE

PRIORITY CLAIM

This patent application is a U.S. National Phase of International Patent Application No. PCT/EP2018/072830, filed 23 Aug. 2018, which claims priority to German Patent Application No. 10 2017 216 774.2, filed 21 Sep. 2017, the disclosures of which are incorporated herein by reference in their entireties.

SUMMARY

Illustrative embodiments relate to a method, a device and a computer-readable storage medium with instructions for controlling a display of an augmented reality head-up display device for a transportation vehicle. Illustrative embodiments further relate to a transportation vehicle in which a disclosed method or a disclosed device is used.

BRIEF DESCRIPTION OF THE DRAWINGS

For a better understanding of the principles of the disclosure, exemplary embodiments are explained in more detail based on the figures, in which.

DETAILED DESCRIPTION

Figure 1:
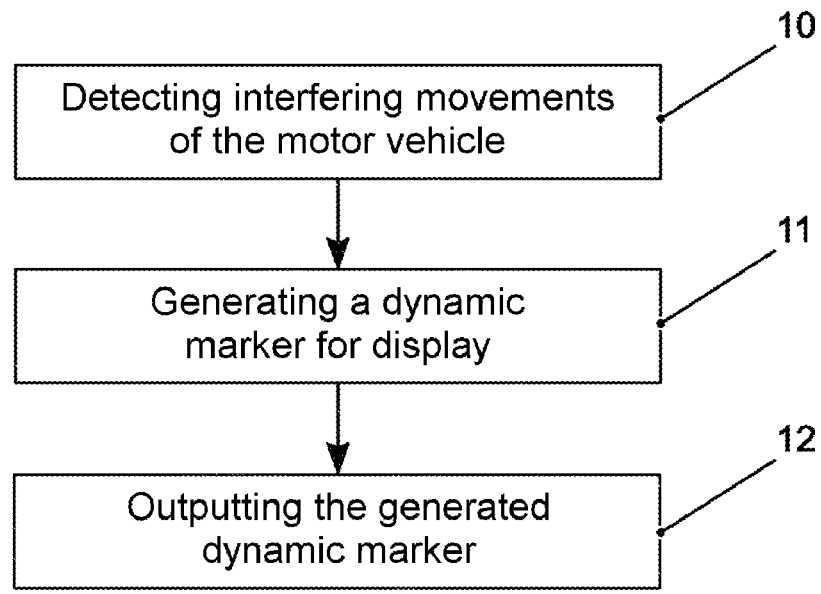
FIG. 1 shows schematically a method for controlling a display of an augmented reality head-up display device for a transportation vehicle.

With the continuous further development of virtual and augmented reality technologies and applications, these are also finding their way into transportation vehicles. Augmented reality (AR) is the enrichment of the real world by virtual elements that are correctly registered in three-dimensional space and allow a real-time interaction. Since the term "augmented reality" has prevailed in the German-speaking world compared to the term "extended reality", the former is used below.

The head-up display (HUD) offers a possible technical implementation to enrich the driver's workstation suitably with perspectively correct virtual extensions. The light rays of a display installed in the dashboard are folded over several mirrors and lenses and reflected into the driver's eye via a projection surface, so that the driver perceives a virtual image outside the transportation vehicle. The projection surface in transportation vehicles is often the windshield, wherein the curved shape thereof must be taken into account in the display. As an alternative, sometimes an additional pane of glass or plastic also used, which is arranged on the dashboard between the driver and the windshield. Due to the optical overlay of the display and the driving scene, fewer head and eye movements are necessary to read the information. In addition, the adaptation effort for the eyes is reduced, because depending on the virtual distance of the display, less or no accommodation at all needs to be made. However, current series manufactured HUDs are limited to displays directly below the primary field of view of the driver and contain redundant information, such as the speed indicator, which can also be found elsewhere in the cockpit. This display technology reduces visual distractions from the road, but still has the drawback that the presented information interprets and responds to the real situation because it is not registered in the real scene. This can be a mentally demanding cognitive process in complex situations. By marker objects and displaying information at the real reference point thereof, i.e., by a contact-analogous representation, environmental information can be represented directly in the driver's field of view. This direct graphical enrichment of the environment, being augmented reality, can significantly reduce cognitive transfer requirements.

In this context, DE 10 2014 214 516 A1 discloses a device, in particular, data glasses or a head-up display, for the reproduction of data in an augmented reality for an occupant of a transportation vehicle. The device is set up to reproduce data, in particular, visual media content, in an image section of the occupant's field of view, which currently and probably in the future contains no essential environmental information for the traffic around the transportation vehicle.

Augmented Reality offers a wide range of applications to support the driver by marking lanes and objects in a contact-analogous way. Relatively obvious examples usually refer to the area of navigation. While classic navigation displays in conventional head-up displays usually display schematic representations, for example, a right-angled arrow to the right as a sign that a right turn should be made at the next opportunity, AR displays offer much more effective possibilities. Since the displays can be displayed as "part of the environment", extremely fast and intuitive interpretations by the user are possible. In modern transportation vehicles, a wide range of data is collected by environmental sensors. It is the aim of current developments to integrate this data meaningfully into augmented reality representations.

Registration of the virtual information in the real field of view of the driver in the sense of augmented reality places very high demands on the technical implementation. To be able to display virtual content in a precise and perspectively correct way in reality, very detailed knowledge about the environment and the movement of the transportation vehicle itself is necessary. For the virtual merging to be perspectively correct in the world for the driver, it must be positioned and aligned in three-dimensional space depending on the position of the transportation vehicle, since the head-up display is installed in the transportation vehicle. The transportation vehicle position changes continuously and highly dynamically due to pitch, roll and yaw movements. Detection by rotation rate sensors and accelerometers is possible with sufficient precision. However, the data processing chain via the sensor data collection through data processing and 3D rendering to the presentation of the display is so long that there is a latency in the region of 100 ms. In augmented reality applications, latencies in the region of 15 ms are already perceived as disturbing.

The transportation vehicle pitch movements have the greatest impact on the positioning of the virtual display. The display appears to wander up and down. Because the relative height represents a strong monocular depth criterion, objects that are displayed higher up in the field of view are perceived by humans as further away. The pitch movements therefore have a direct effect on the perceived image distance. As a result, the influences of driving dynamics lead to the virtual image being perceived as unsettled and not located in a stable manner.

Against this background, DE 10 2014 221 608 A1 describes a method for deactivating a contact-analogous display on data glasses in a transportation vehicle. For this purpose, data will be provided relating to the movement of the transportation vehicle, in particular, the lateral acceleration of the transportation vehicle. As long as the transportation vehicle movement of the transportation vehicle exceeds a predetermined threshold value, the display of a contact-analogous representation on the data glasses will be suspended.

The above approach ensures that the virtual image is perceived as relatively stable, but with the mandatory restriction that no contact-analogous representation is made in the event of large transportation vehicle movements. Another approach to reducing the problem described is to reduce the latency that occurs by optimizing the hardware or software. For example, with regard to hardware, the tracking method can be optimized by increasing the temporal and spatial sampling rate or by synchronizing [1]. With regard to the software, predictive tracking [2], late latching [3] and image deflection [4] should be mentioned. However, the approaches mentioned involve a considerable cost.

DE 10 2009 004 432 A1 describes a display device for a transportation vehicle. An obstacle placed in front of the transportation vehicle is captured by a camera, and its characteristics including speed, distance, size, etc. are analyzed by electronic circuits. An image showing the features of the front object is output by a liquid crystal panel. The output image is reflected on the windshield, wherein a virtual image is displayed for the driver. The virtual image is displayed as a light spot that encircles the front obstacle seen through the windshield.

Disclosed embodiments reveal alternative solutions for controlling a display of an augmented reality head-up display device for a transportation vehicle.

This is achieved by a method, by a computer-readable storage medium with instructions and by a device.

According to a first disclosed embodiment, a method for controlling a display of an augmented reality head-up display device for a transportation vehicle includes:
  Detecting interfering movements of the transportation vehicle, wherein the interfering movements are detected with an accelerometer or derived from road conditions;
  Generating a marker for display by the augmented reality head-up display device, wherein the marker has a dynamic design in the event that interfering movements of the transportation vehicle are detected; and
  Outputting the marker for display by the augmented reality head-up display device.

According to another disclosed embodiment, a computer-readable storage medium contains instructions which, when executed by a computer, cause the computer to perform the following operations to control a display of an augmented reality head-up display device for a transportation vehicle:
  Detecting interfering movements of the transportation vehicle, wherein the interfering movements are detected with an accelerometer or derived from road conditions;
  Generating a marker for display by the augmented reality head-up display device, wherein the marker has a dynamic design in the event that interfering movements of the transportation vehicle are detected; and
  Outputting the marker for display by the augmented reality head-up display device.

The term computer is widely understood. It also includes control units and other processor-based data processing devices.

According to another disclosed embodiment, a device for controlling a display of an augmented reality head-up display device for a transportation vehicle has:
  An analysis unit for detecting interfering movements of the transportation vehicle, wherein the interfering movements are detected with an accelerometer or derived from road conditions;
  A graphics generator for generating a marker for display by the augmented reality head-up display device, wherein the graphics generator is set up to generate the marker with a dynamic design in the event that interfering movements of the transportation vehicle are detected; and
  An output for outputting the marker for display by the augmented reality head-up display device.

Inappropriate movements of the display are perceived by users as annoying because the visual system reacts very sensitively to movements in a settled or static environment. If a settled display is expected, movements stand out from the visual scene and thus disturb the overall impression. According to the disclosed embodiments, this effect is reduced by a dynamic or movable design of the display, because then additional disturbance-related movements due to the driving dynamics are not so salient with respect to the correct display, which already contains a basic movement. By the dynamic design of the marker, the subjective perception of the interfering movement is thus reduced. The marker only has a dynamic design if interfering movements of the transportation vehicle are detected. Since a dynamic display may have a higher distraction potential, it is highly recommended not to apply the solution approach permanently, but only in times when strong movements of the display occur or are to be expected.

The interfering movements of the transportation vehicle may be detected with an accelerometer or derived from road conditions. Since the latency is almost constant, the strength of the display movement can be derived directly from the transportation vehicle movements. These can be captured relatively easily by a gyroscope. However, movements of the transportation vehicle structure are not only stimulated by dynamic processes such as acceleration and braking, but also by the type of road conditions. Therefore, an analytical evaluation of the road surface for the purpose of an intelligent application of dynamic display elements may also be provided.

According to at least one disclosed embodiment, the marker is a contact-analogous marker. Inappropriate movements of the marker are noticeable in contact-analogous markings, since a reference object is available to the user, for example, a transportation vehicle or a traffic sign highlighted by the marker. The application of the disclosed solution is therefore beneficial for contact-analogous markings.

According to at least one disclosed embodiment, the dynamic design of the marker includes a design as a running light or a pulsation of the marker. In this case, a running direction of the running light may correspond to a direction of interfering movements of the transportation vehicle. Both design options can be easily realized without bringing too much movement and thus restlessness into the display.

According to at least one disclosed embodiment, the marker has a dynamic design only if the interfering movements of the transportation vehicle exceed a threshold value. In this way, excessively frequent switching between a static design of the marker and a dynamic design of the marker is prevented, which otherwise could be perceived by the user as annoying.

According to at least one disclosed embodiment, the interfering movements are pitch movements of the transportation vehicle. As described at the beginning, the interfering movements of the display result mainly from pitch movements of the transportation vehicle in combination with a relatively high system latency. The larger the pitch angle and the higher the pitch rate of the transportation vehicle at constant latency, the greater the effect on the display movement. In practice, therefore, it is sufficient to capture only the pitch movements and to evaluate them for the purpose of the intelligent application of a dynamic design.

According to at least one disclosed embodiment, the road conditions are detected by a laser scanner or a stereo camera or are taken from map material. Modern map material sometimes already contains information about the type of roadway, so that the road conditions can be taken directly from the map material without further sensors. Furthermore, scanning of the roadway by stereo camera and laser scanner is also possible. Since such sensors are sometimes already installed in the transportation vehicle for other applications, these components can be used at no additional cost.

A disclosed method or a disclosed device are beneficial used in a transportation vehicle.

FIG. 1 shows schematically a method for controlling a display of an augmented reality head-up display device for a transportation vehicle. By an appropriate methodology, interfering movements of the transportation vehicle are detected 10, in particular, pitch movements of the transportation vehicle. For example, the interfering movements of the transportation vehicle can be detected with an accelerometer or derived from a road surface. The road surface can be detected by a laser scanner or a stereo camera or taken from map material. In addition, a graphics generator generates 11 a marker for display by the augmented reality head-up display device, wherein the marker has a dynamic design. The dynamic design can include a design as a running light or a pulsation of the marker. For example, the marker can be a contact-analogous marker. The generated marker is finally output 12 to a control device of the augmented reality head-up display device for display by the augmented reality head-up display device. Optionally, the marker has a dynamic design only if interfering movements of the transportation vehicle are detected. It may be provided that the interfering movements must also exceed a threshold value. Alternatively, instead of outputting the generated marker to the control unit, only an instruction may be issued to the control unit to generate a marker with a dynamic design. Likewise, it is possible that the described method is executed entirely from the control unit of the augmented reality head-up display device.

Figure 2:
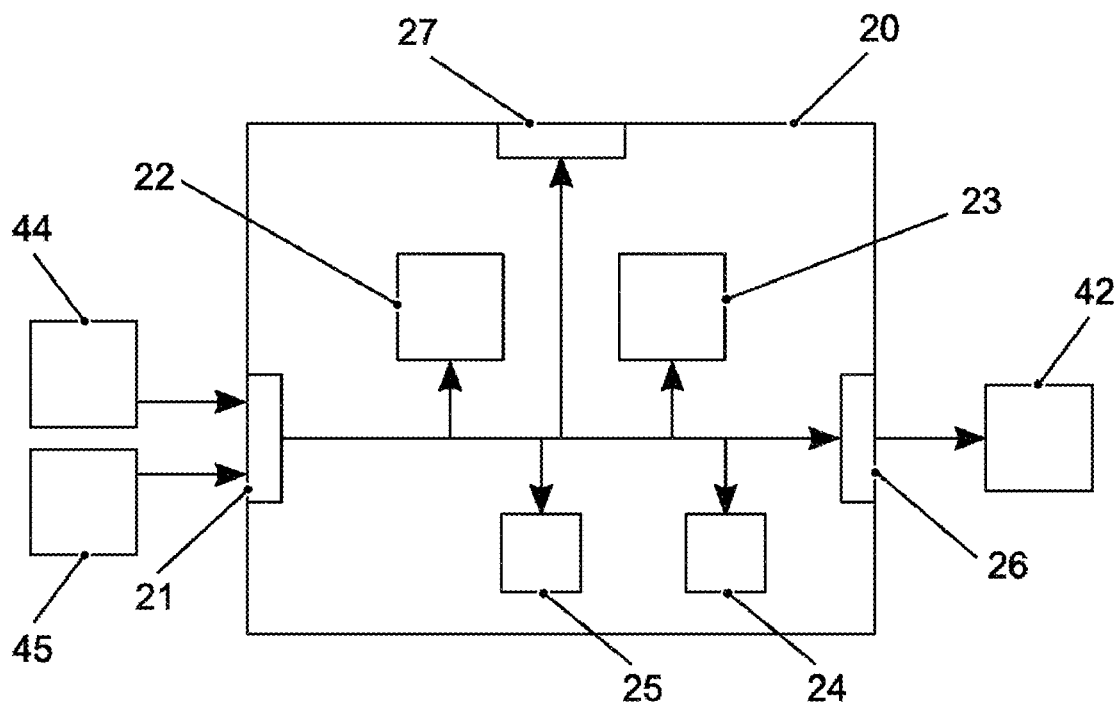
FIG. 2 shows a first embodiment of a device for controlling a display of an augmented reality head-up display device for a transportation vehicle.

FIG. 2 shows a simplified schematic representation of a first disclosed embodiment of a device 20 for controlling a display of an augmented reality head-up display device for a transportation vehicle. The device 20 has an input 21, by which information about movements of the transportation vehicle or about the road conditions can be received from a sensor system 44 or from a navigation system 45. The sensor system 44 may have an accelerometer. The movements of the transportation vehicle can alternatively also be derived from the road conditions. In this case, the sensor system 44 may have a laser scanner or a stereo camera for detecting the road conditions. The road conditions can also be taken from map material.

The device 20 also has an analysis unit 22 for detecting interfering movements of the transportation vehicle, in particular, of pitch movements of the transportation vehicle. A graphics generator 23 generates a marker for display by the augmented reality head-up display device, wherein the marker has a dynamic design. The generated marker is output via an output 26 of the device 20 to a control unit 42 of the augmented reality head-up display device. Alternatively, only an instruction may be issued to the control unit 42 to generate a marker with a dynamic design. The control unit 42 can then insert the generated marker into a display of the augmented reality head-up display device. The marker has a dynamic design only if interfering movements of the transportation vehicle are detected. It may be provided that the interfering movements must also exceed a threshold value.

The analysis unit 22 and the graphics generator 23 can be controlled by a control unit 24. Settings of the analysis unit 22, the graphics generator 23 or the control unit 24 can be changed via a user interface 27. The data arising in the device 20 can be stored if necessary in a memory 25 of the device 20, for example, for later evaluation or for use by the components of the device 20. The analysis unit 22, the graphics generator 23 and the control unit 24 can be implemented as dedicated hardware, for example, as integrated circuits. Of course, they can also be partially or completely combined or implemented as software that runs on a suitable processor, for example, on a GPU. The input 21 and the output 26 may be implemented as separate interfaces or as a combined bidirectional interface. In the example described, the device 20 is a standalone component. However, it can also be integrated into the control unit 42 of the augmented reality head-up display device.

Figure 3:
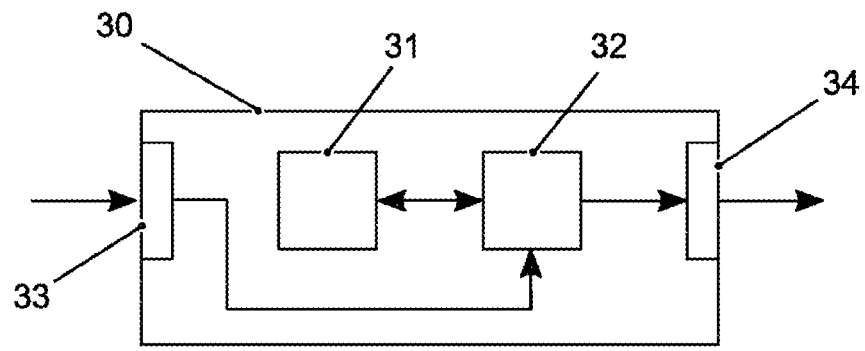
FIG. 3 shows a second embodiment of a device for controlling a display of an augmented reality head-up display device for a transportation vehicle.

FIG. 3 shows a simplified schematic representation of a second disclosed embodiment of a device 30 for controlling a display of an augmented reality head-up display device for a transportation vehicle. The device 30 has a processor 32 and a memory 31. For example, the device 30 is a computer or a control unit. Instructions are stored in the memory 31 that when executed by the processor 32 cause the device 30 to perform the operations as claimed in any one of the described methods. The instructions stored in memory 31 thus embody a program executable by the processor 32 that implements the disclosed method. The device 30 has an input 33 for receiving information about graphical data or information about interfering movements, for example. Data generated by the processor 32 is provided via an output 34. In addition, the data can be stored in a memory 31. The input 33 and the output 34 may be combined into a bidirectional interface.

The processor 32 may include one or more processor units, such as microprocessors, digital signal processors, or combinations thereof.

The memories 25, 31 of the described embodiments may have both volatile and non-volatile memory areas and may include a wide range of storage devices and storage media, such as hard drives, optical storage media, or semiconductor memory.

Figure 4:
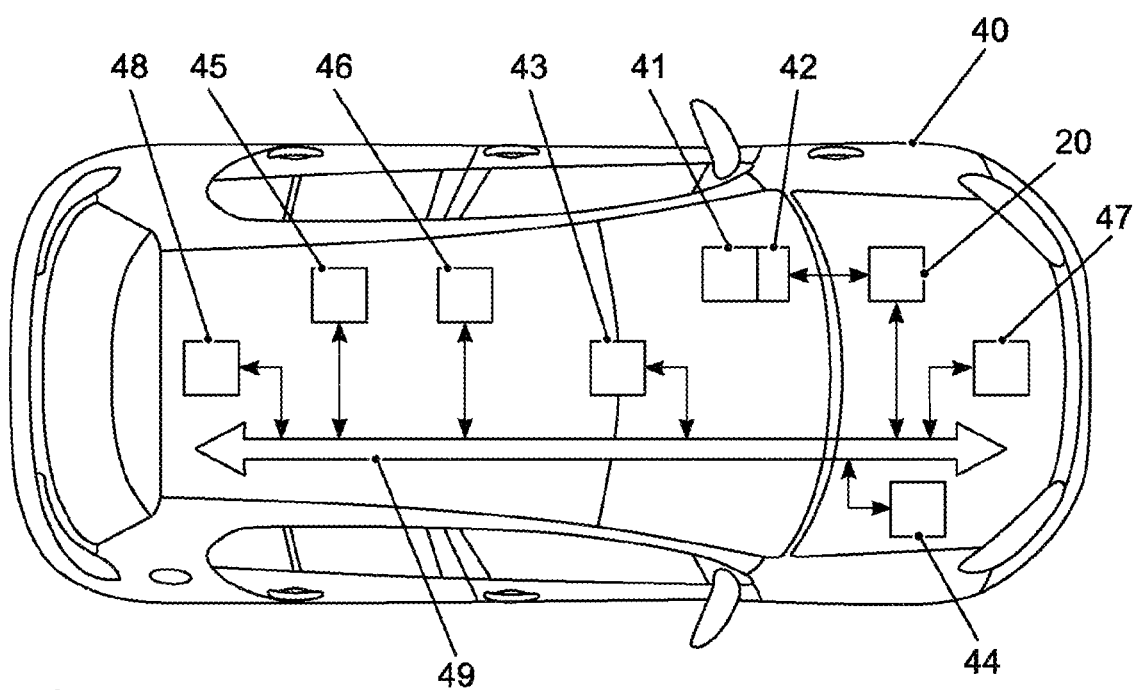
FIG. 4 shows schematically a transportation vehicle in which a disclosed solution is realized.

FIG. 4 represents schematically a transportation vehicle 40 in which a disclosed solution is implemented. The transportation vehicle 40 has an augmented reality head-up display device 41 with an associated control unit 42. Furthermore, the transportation vehicle 40 has a device 20 for controlling a display of the augmented reality head-up display device 41. The device 20 can of course also be integrated into the augmented reality head-up display device 41 or into the control unit 42 of the augmented reality head-up display device 41. Other components of the transportation vehicle 40 are a camera 43, a sensor system 44 for the detection of transportation vehicle movements, a navigation system 45, a data transmission unit 46 and a series of assistance systems 47, one of which is shown as an example. A connection to service providers can be established by the data transmission unit 46, for example, for retrieving map data. There is a memory 48 for storing data. The data exchange between the various components of the transportation vehicle 40 takes place over a network 49.

Exemplary embodiments are described below based on FIGS. 5 to 9.

Figure 5:
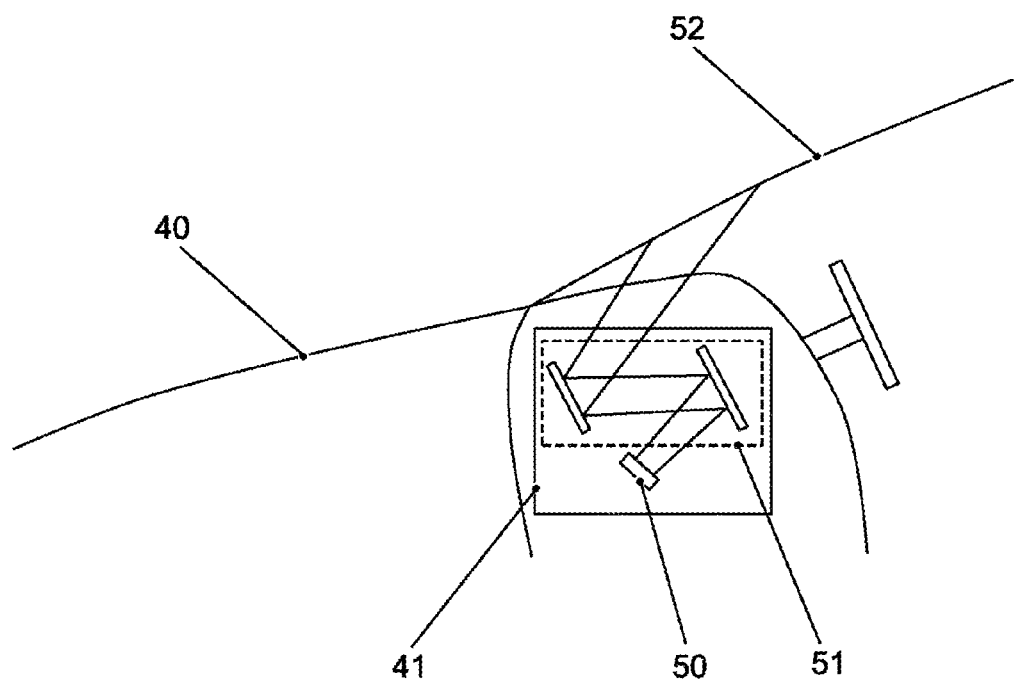
FIG. 5 shows schematically the general structure of a head-up display device for a transportation vehicle.

FIG. 5 shows schematically an augmented reality head-up display device 41 for a transportation vehicle 40, using which contents can be displayed on a projection area 52 of the transportation vehicle 40, for example, on the windshield or on an additional glass or plastic pane arranged on the dashboard between the driver and the windscreen. The presented contents are generated by an image generating unit 50 and are projected onto the projection surface 52 by an optical module 51. Typically, the projection takes place in an area of the windshield above the steering wheel. For example, the image-generating unit 50 can be an LCD TFT display. The augmented reality head-up display device 41 is usually installed in a dashboard of the transportation vehicle 40.

Figure 6:
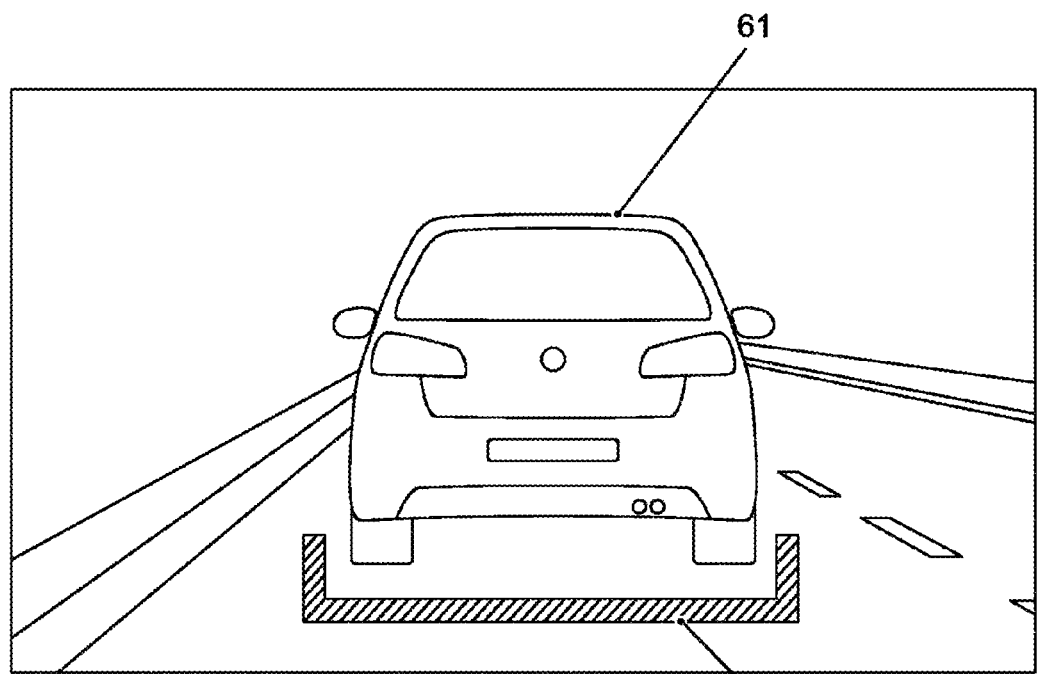
FIG. 6 shows an example of an augmented reality representation of a head-up display device.

FIG. 6 shows an example of an augmented reality representation of an augmented reality head-up display device. The actual environment is overlaid by a marker 60 in a contact-analogous representation, which marks a transportation vehicle ahead 61 for the visualization of an ACC system status (ACC: Adaptive Cruise Control). Navigation information, warnings, or other items can also be shown. The drawback of the marker 60 is that it moves up and down relative to the transportation vehicle ahead 61 for the observer in the event of pitch movements of the transportation vehicle.

Figure 7:
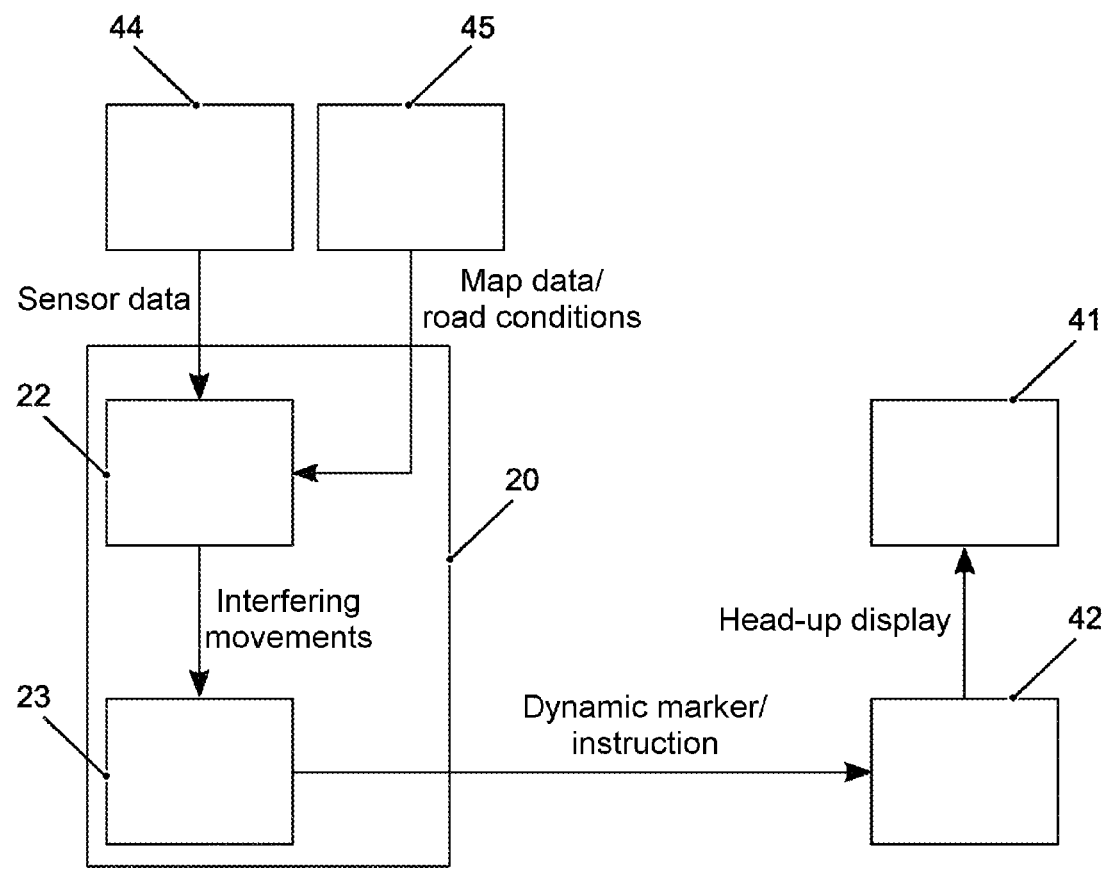
FIG. 7 shows a system design of the disclosed solution for controlling a display of an augmented reality head-up display device for a transportation vehicle.

FIG. 7 shows a system design of the disclosed solution for controlling a display of an augmented reality head-up display device for a transportation vehicle. A sensor system 44 transmits sensor data to the device 20 for controlling the display of the augmented reality head-up display device 41. Alternatively or in addition, map data or information about road conditions are transmitted from a navigation system 45 to the device 20. An analysis unit 22 detects interfering movements by this information. Information about the occurrence of interfering movements is passed from the analysis unit 22 to a graphics generator 23, which then generates a dynamic marker. This is output to a control unit 42 of the augmented reality head-up display device 41, which in turn generates the head-up display for the augmented reality head-up display device 41. Alternatively, an instruction can be issued to the control unit 42 for it to generate a dynamic marker. In addition, the device 20 may also be part of the control unit 42.

Figure 8:
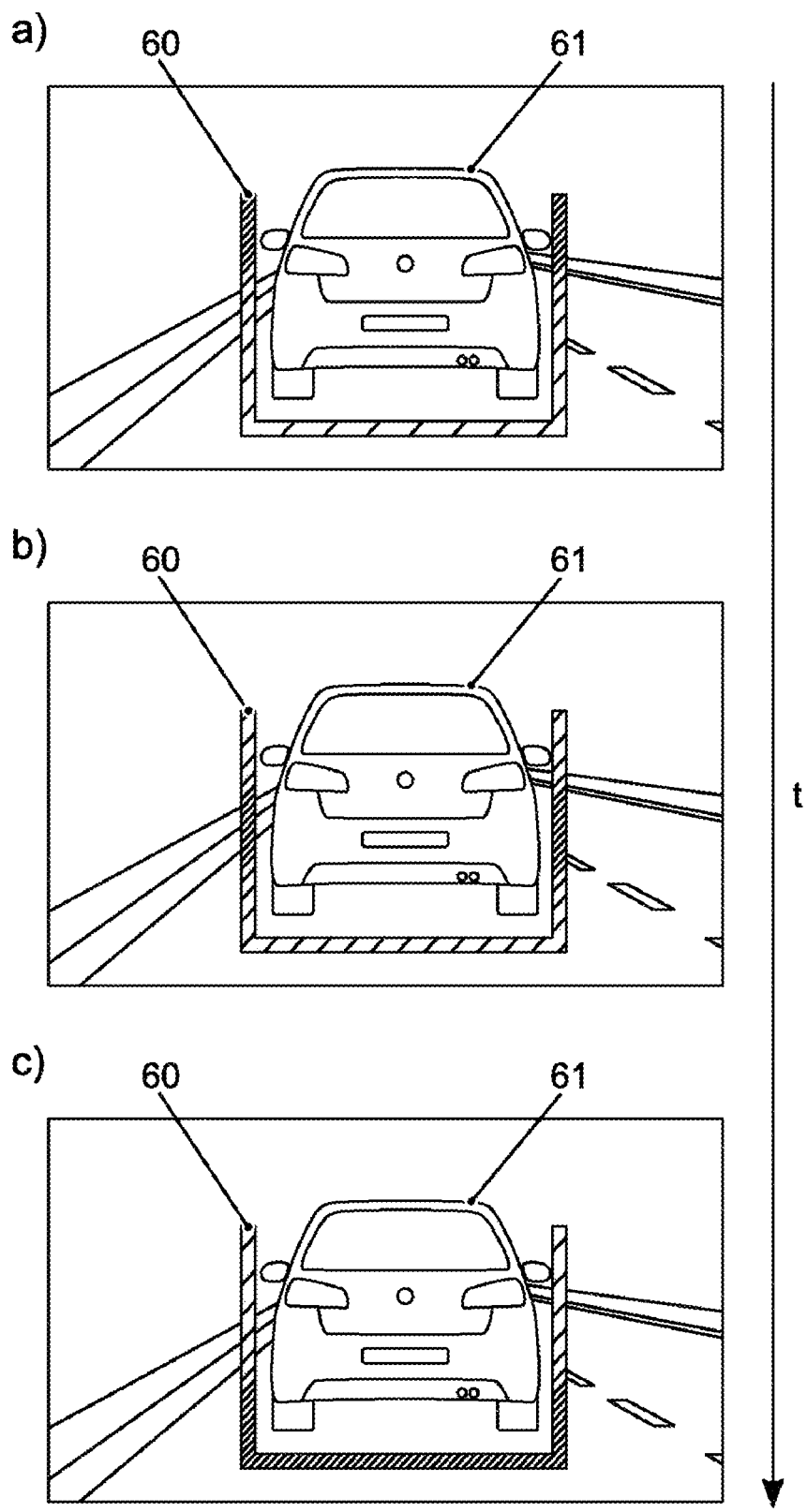
FIGS. 8*a-c* shows a first example of a dynamic design of a marker.

FIG. 8 shows a first example of a dynamic design of a marker 60. In this example, the contact-analogous marker 60 of the transportation vehicle ahead 61 is designed as a running light. The variation against time of the marker 60 is shown on the basis of three consecutive points in time. The density of the filling of the marker 60 indicates approximately the perceptibility of the marker 60 at the corresponding position. The perceptibility can be controlled, for example, by a luminosity. The movement of the running light runs from above to below, i.e., along the z-axis of the transportation vehicle. The running light thus generates a basic dynamic in the same direction in which the virtual image also moves against the stable background. The image movement becomes less visible as a result.

Figure 9:
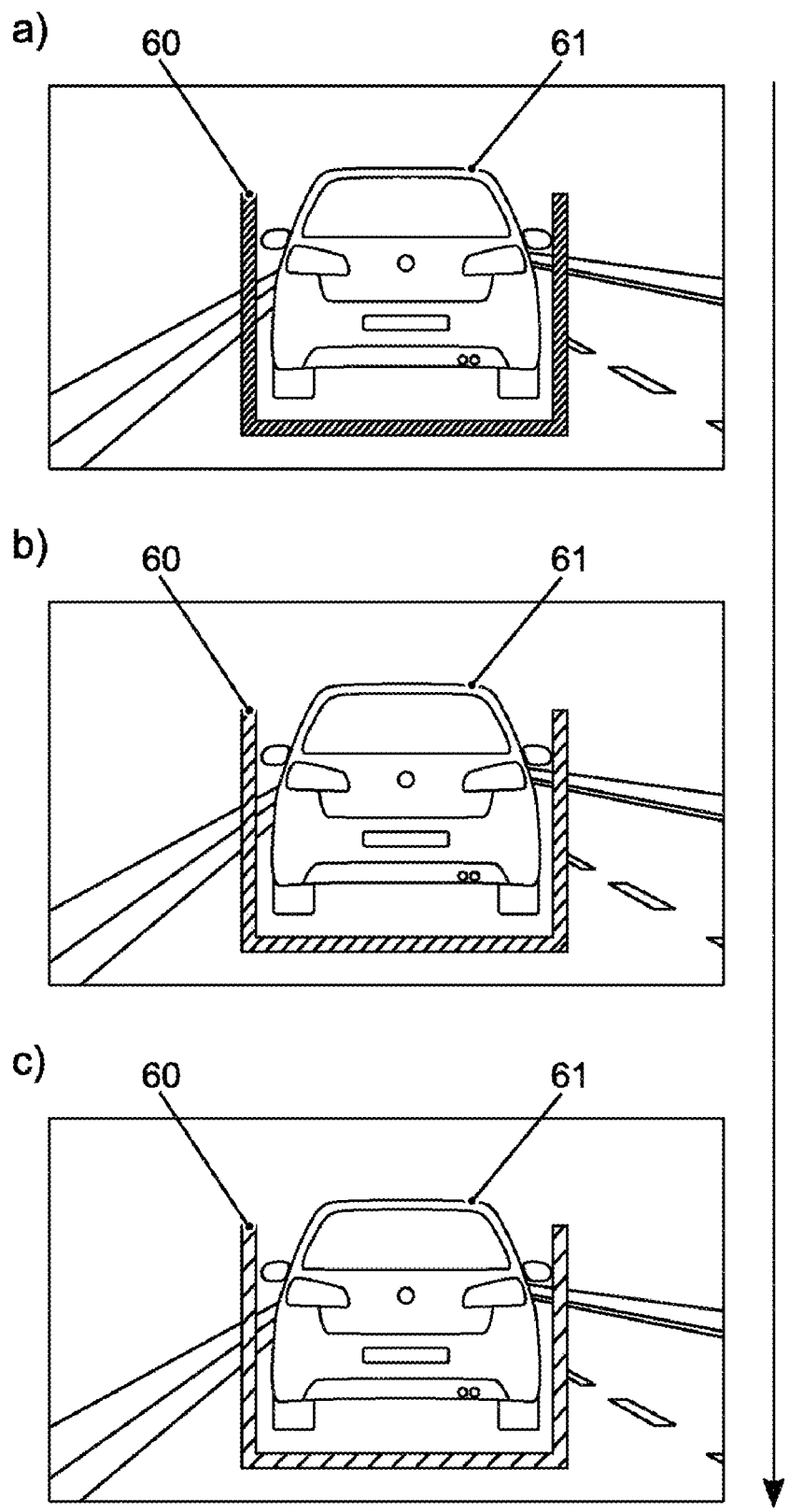
FIGS. 9*a-c* shows a second example of a dynamic design of a marker.

FIG. 9 shows a second example of a dynamic design of a marker 60. In this example, the contact-analogous marker 60 of the transportation vehicle ahead 61 is designed to pulsate. The variation against time of the marker 60 is again shown on the basis of three consecutive points in time. The density of the filling of the marker 60 again indicates the perceptibility of the marker 60 at the corresponding position. In this form of dynamic design, the dynamics are not connected to a direction of movement, but the fading in and out of the marker 60 distracts the viewer to a certain extent from the relative movement of the virtual image against the stable background.

For the specific implementation of the dynamic design, the person skilled in the art has a wide range of design options available. In addition to the described running light or pulsation, a dynamic can be implemented by a color change of the marker, by flashing (as an extreme form of pulsation) of the marker or by a spatial movement or jumping of the marker, for example.

REFERENCE CHARACTER LIST

10 Detecting interfering movements of the transportation vehicle
11 Generating a dynamic marker for display
12 Outputting the generated dynamic marker
20 Device
21 Input
22 Analysis unit
23 Graphics generator
24 Control unit
25 Memory
26 Output
27 User interface
30 Device
31 Memory
32 Processor
33 Input
34 Output
40 Transportation vehicle
41 Augmented reality head-up display device
42 Control unit of the augmented reality head-up display device
43 Camera
44 Sensor system
45 Navigation system
46 Data transmission unit
47 Assistance system
48 Memory
49 Network
50 Image generating unit 51 Optical module
52 Projection surface
60 Marking
61 Transportation vehicle ahead

REFERENCES

[1] www.hizook.com/blog/2015/05/17/valves-lighthouse-tracking-system-may-be-big-news-robotics
[2] developer3.oculus.com/blog/the-latent-power-of-prediction/
[3] developer3.oculus.com/blog/optimizing-vr-graphics-with-late-latching/
[4] Pelot: "Dynamic Blanking for Virtual Reality Image Displacement", web.stanford.edu/class/ee267/Spring2016/report_pelot.pdf

The invention claimed is:

1. A method for controlling a display of an augmented reality head-up device for a transportation vehicle, the method comprising:
   detecting interfering movements of the transportation vehicle, wherein the interfering movements are detected with an accelerometer or from road conditions;
   generating a marker for display by the augmented reality head-up display device, wherein the marker includes a dynamic design;
   outputting the marker for display by the augmented reality head up display device; and
   altering a density of a filling of the marker while maintaining a size and a shape of the marker in response to interfering movements of the transportation vehicle being detected,
   wherein the altering of the density of the marker includes altering the density via a running light displayed within the marker, and wherein a running direction of the running light is the same as a direction that the marker moves relative to a static background of a road and a surrounding environment on which the transportation vehicle is currently operating.

2. The method of claim 1, wherein the marker is a contact-analogous marker.

3. The method of claim 1, wherein the altering of the density of the filling of the marker includes a pulsation of the marker.

4. The method of claim 1, wherein the altering the density of the filling of the marker is carried out only in response to the interfering movements of the transportation vehicle having exceeded a threshold value.

5. The method of claim 1, wherein the interfering movements of the transportation vehicle are pitch movements.

6. The method of claim 1, wherein the road conditions are detected by a laser scanner or a stereo camera or are taken from map material.

7. A non-transitory computer-readable medium including instructions that, when executed by a computer, cause the computer to perform a method for controlling a display of an augmented reality head-up display device for a transportation vehicle, the method comprising:
   a method for controlling a display of an augmented reality head-up device for a transportation vehicle, the method comprising:
   detecting interfering movements of the transportation vehicle, wherein the interfering movements are detected with an accelerometer or derived from road conditions;
   generating a marker for display by the augmented reality head-up display device, wherein the marker includes a dynamic design;
   outputting the marker for display by the augmented reality head up display; and
   altering a density of a filling of the marker while maintaining a size and a shape of the marker in response to interfering movements of the transportation vehicle being detected,
   wherein the altering of the density of the marker includes altering the density via a running light displayed within the marker, and wherein a running direction of the running light is the same as a direction that the marker moves relative to a static background of a road and a surrounding environment on which the transportation vehicle is currently operating.

8. A device for controlling a display of an augmented reality head-up display device for a transportation vehicle, the device comprising:
   an analysis unit for detecting interfering movements of the transportation vehicle, wherein the interfering movements are detected with an accelerometer or derived from road conditions;
   a graphics generator for generating a marker for display by the augmented reality head-up display device, the marker having a dynamic design, wherein the graphics generator is configured to alter a density of a filling of the marker while maintaining a size and a shape of the marker in response to interfering movements of the transportation vehicle being detected; and
   an output for outputting the marker for display by the augmented reality head-up display device,
   wherein the altering of the density of the marker includes altering the density via a running light displayed within the marker, and wherein a running direction of the running light is the same as a direction that the marker moves relative to a static background of a road and a surrounding environment on which the transportation vehicle is currently operating.

9. A transportation vehicle with an augmented reality head-up display device, the transportation vehicle comprising the device of claim 8 and is set up for performing a method to control the display of the augmented reality head-up display device.

10. The non-transitory computer readable medium of claim 7, wherein the marker is a contact-analogous marker.

11. The non-transitory computer readable medium of claim 7, wherein the altering of the density of the filling of the marker includes a pulsation of the marker.

12. The non-transitory computer readable medium of claim 7, wherein the altering the density of the filling of the marker is carried out only in response to the interfering movements of the transportation vehicle having exceeded a threshold value.

13. The non-transitory computer readable medium of claim 7, wherein the interfering movements of the transportation vehicle are pitch movements.

14. The non-transitory computer readable medium of claim 7, wherein the road conditions are detected by a laser scanner or a stereo camera or are taken from map material.

15. The device of claim 8, wherein the marker is a contact-analogous marker.

16. The device of claim 8, wherein the altering of the density of the filling of the marker includes a pulsation of the marker.

17. The device of claim 8, wherein the graphics generator altering the density of the filling of the marker is carried out only in response to the interfering movements of the transportation vehicle having exceeded a threshold value.

18. The device of claim 8, wherein the interfering movements of the transportation vehicle are pitch movements.

19. The device of claim 8, wherein the road conditions are detected by a laser scanner or a stereo camera or are taken from map material.

* * * * *